[62.]

(2 Sheets) Sheet No. 1.

JULIUS C. HINTZ.

Improvement in Permutation Locks.

No. 4,542. Reissued Sep. 5. 1871.

Witnesses.

Harry King.

W. Thos. Hutchinson

Inventor.

J. C. Hintz.

by Dodger & Munn

Attys.

[62.] (2 Sheets) Sheet No. 2.

JULIUS C. HINTZ.

Improvement in Permutation Locks.

No. 4,542. Reissued Sep. 5. 1871.

Witnesses.

Harry King

W. Thos. Hutchinson

Inventor.

J. C. Hintz

By Dodge & Munn.

Attys.

UNITED STATES PATENT OFFICE.

JULIUS C. HINTZ, JR., OF CINCINNATI, OHIO.

IMPROVEMENT IN PERMUTATION LOCKS.

Specification forming part of Letters Patent No. 108,481, dated October 18, 1870; reissue No. 4,542, dated September 5, 1871.

*To all whom it may concern:*

Be it known that I, JULIUS C. HINTZ, Jr., of Cincinnati, in the county of Hamilton and State of Ohio, have invented a certain new and useful Improved Permutation Lock; and I do hereby declare that the following is a full, clear, and exact description of the construction and operation of the same, reference being had to the annexed drawing making part of this specification, in which—

Figure 5:
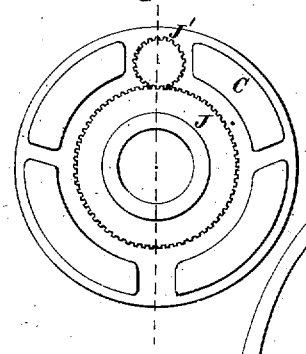
Figure 1:
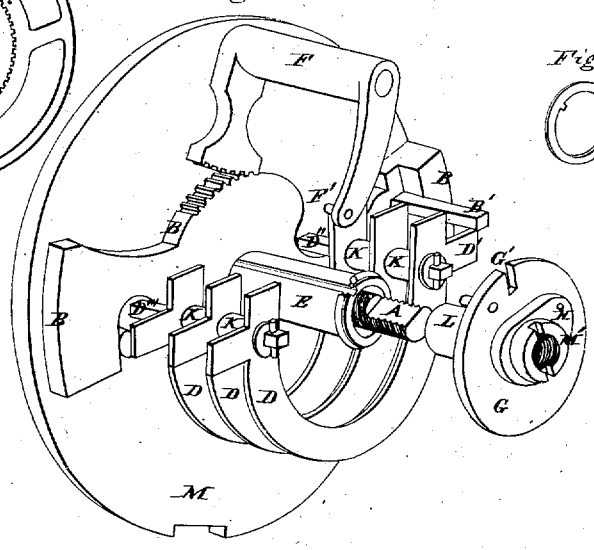
Figure 6:
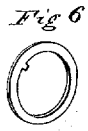
Figure 2:
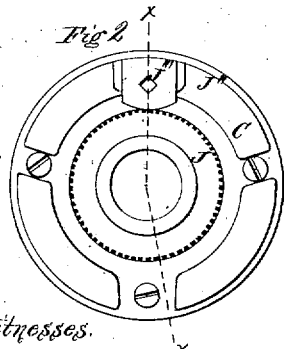
Figure 3:
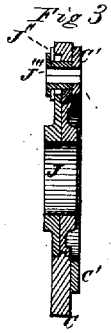
Figure 4:
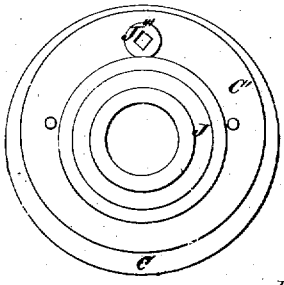
Figure 7:
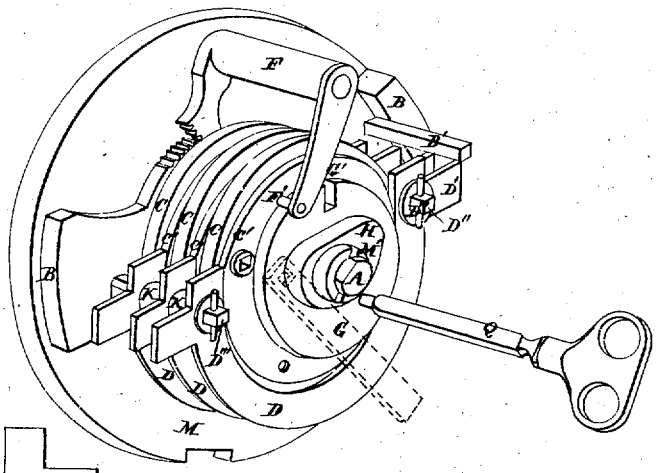
Figure 9:
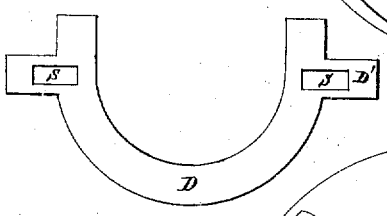
Figure 8:
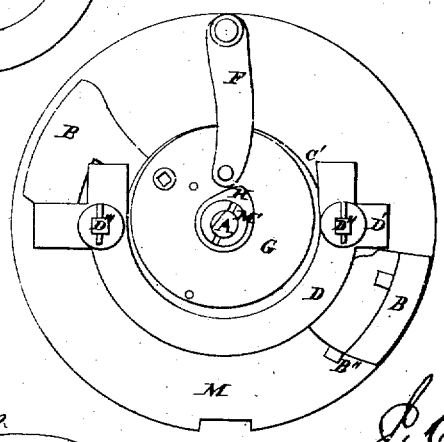

Figure 1 is a perspective view with the permutation wheels removed and the sleeved disk G drawn out from the arbor A. Fig. 2 is a plan of the reverse side of a permutation wheel. Fig. 3 is a section through the line *x x* in Fig. 2. Fig. 4 is a plan of front of same, showing cam *c'* on its face. Fig. 5 is a plan of reverse side of same, with cap J'' and screw J''' removed so as to show pinion J'. Fig. 6 is a view of the keyed washers which separate the permutation wheels. Fig. 7 is a perspective view, locked. Fig. 8 is a front elevation, unlocked, and the sleeved disk G removed. Fig. 9 is a view of a part detached.

The objects of my improvements are, first, greater security against burglars; and, second, greater simplicity and consequent economy.

Similar letters refer to similar parts throughout the drawing.

A is a spindle attached to the knob or handle and passing through the lock. E is a sleeve rigidly fastened at the outer end to the lock-case. The spindle turns easily inside this sleeve, and at its inner end is a male screw, which works in a female screw inside the sleeve L, and over which the disk G is rigidly attached. The inner end of the screw is flattened on one side, as shown in Fig. 1. The carrying-dog H, which may be of any convenient shape, fits neatly over this part of the spindle, and has a pin passing through it, riveted on the outside, and which fits in an appropriate recess in the face of the disk G, Fig. 7. This, together with the nut M', which is screwed on the spindle A and binds the carrying-dog to its place, prevents the screw from working when it is desired to operate the lock by the spindle. C C C the are permutation wheels, which work loosely over the sleeve E, through which the spindle runs. They have the usual connecting-pins or projections upon their faces for the purpose of moving each other. The disk G has also such a pin, which interlocks with a similar one upon the face of the wheel contiguous to it. This pin in the disk G is shown in the drawing; the similar ones in the wheels are not shown. A longitudinal groove is made in the sleeve E, shown in Fig. 1. Metallic washers, each having a projection fitting neatly in this groove, are placed around the said sleeve, one between each two of the permutation wheels. These wheels each have a wheel, J, and pinion J', Fig. 5, for the purpose of changing the combination of the lock. Both wheel J and pinion J' sit in recesses, respectively, provided for them, and in which they turn easily. The pinions are secured in their places by clamps J''. Through the clamp, pinion, and the body of the permutation wheel a bolt, J''', is passed, having a head, which binds the clamp J''. The lower end of the bolt J''' is a male screw and fits into a female screw cut into the permutation wheels below the pinion-seat. Through this bolt, longitudinally, there is a square hole, in which the key Q, which is to be used in changing the combination, fits, clearly shown in Fig. 2. The cog-wheels J sit neatly in their places without being otherwise fastened. The connecting-pins, by which the wheels operate each other, are attached to the cog-wheels so that they may be revolved without moving the remaining parts of the combination wheels when the screw-bolt J''' is loosened, as afterward explained. When the screw-bolt J''' is tightened the cog-wheels and pinions do not move separately. There is a cam upon the face of each permutation wheel whose diameter is one-fourth of an inch less than that of the wheel, and placed one-eighth of an inch eccentric to the periphery of the wheel. D D D are yokes, suspended upon square pins D'' D''' projecting from the lock-case, with tubular washers K between them, in the manner clearly shown in Fig. 1. The distance of the arms of the yoke from each other is equal to the diameter of the cams. D' are arms upon the yokes D, which sustain the projecting pin B', which is permanently attached to the rear or weighted end of the bolt B. Other similar-shaped arms are shown upon the other ends of the yokes, but their only object is symmetry. The holes S in the arms of the yokes, through which the square pins pass, are slotted laterally so as to permit as much play as the eccentricity of the cams may require. The upper edges of the arms D' are made a scintilla too low to support or come in contact with the pin B′, except when the pin F′ falls into the notch G′. When locked, the periphery of the disk G, by contact with the pin F, always sustains the bolt at such a position that the pin B′ is just above the arms D′, except when the pin F′ is above or in the notch G′; and, in order that the pin F′ in its fall may be as noiseless as possible, the edge of the disk G is chamfered slightly for a very small distance on each side of the notch G′. When the arms D′ are withdrawn and the notch G′ presented to the pin F′ the bolt falls by its own gravity. The bolt B plays loosely on the sleeve E. It is formed so as not to interfere throughout its range of motion with the square pins D″ D‴. It receives its motion, through the link F, from the disk G by means of the catch F′, which interlocks in the slot G′ of the disk G, and of the cogs on the rear arm of the link, which gear into the cogs on the bolt. B″ is a stop which limits the downward fall of the bolt B. The knob, not shown in the drawing, has the usual dial, and correspondingly-fixed mark on the stationary ring surrounding the dial, for the purpose of indicating the location of the permutation wheels.

The operation is as follows: Assuming it to be locked and it to be desired to open it, the knob is turned as many full revolutions to the left as there are combination wheels, and so much of an additional revolution as will bring the first number on which the lock is set on the dial opposite the mark provided on the stationary ring; the knob is then turned to the right as many full revolutions, less one, as there are combination wheels, and so much of an additional revolution as will bring the second number on which the lock is set on the dial opposite the mark on the stationary ring; the knob is then turned to the left as many full revolutions, less two, as there are combination wheels, and so much of an additional revolution as will bring the third number on which the lock is set on the dial opposite the mark on the stationary ring. The first operation above described has set the wheel nearest the bolt, the second has set the wheel second from the bolt, and the third has set the wheel third from the bolt. If there be only three wheels the lock is now set, and it may be opened by turning the knob slowly to the right until the notch G′ of the disk G is immediately under the pin F′ of the link F, when the pin will fall into the notch by the rear end of the bolt, which is for that purpose weighted, falling by its own gravity, the previously-described operations having separately withdrawn, by the operations of the cams C′, the arms D′ from underneath the projecting pin B′. The combination cannot be disarranged when the bolt is withdrawn. To disarrange, when locked, turn the knob three or more times to the left. To change the combination, select a number on the dial for every combination wheel. Assuming that there are three wheels and it is desired to set the lock to any three given numbers: arrange the wheels upon the combination previously set; then insert the key Q into the appropriate hole in the bolt J‴ inside of the lock until the little stump, which is not new and not shown in the drawing, has entirely entered the clutch of the key; turn the key a quarter circle to the left, which will loosen the pinion J′ and permit wheel and pinion to revolve together. If the knob be now turned, the connecting-pins or projections by which the permutation wheels move each other being upon the wheels J and the pinions J′ free to revolve, the wheels J will revolve, while the cams C′ and all the portions of the permutation wheels C to which they are rigidly attached will remain stationary. If, now, the process previously described for opening the lock be gone through, varied only by stopping during the additional revolutions at the newly-selected numbers, the combination will be changed, as desired; but as soon as the last wheel of the combination is set, and before attempting to move the bolt, the pinion J′ must be tightened and the key Q withdrawn.

Having thus described my invention, what I claim as new, and desire to secure by Letters Patent, is—

1. In combination with wheel C and cam C′, the pinion J′, wheel J, clamp J″, and bolt J‴, when constructed and arranged for operation as herein described.

2. In combination with wheel C and cam C′, the yokes D provided with slots S and mounted on pins D″ D‴.

3. The yokes D provided with slots S and arms D′, and arranged to move laterally on pins D″ D‴, in combination with the projecting pins B′ and bolt B.

4. The notched disk G, with its sleeve L, in combination with the swinging bolt B working on the sleeve E, and the link F pivoted to the case M, substantially as described.

5. The swinging bolt B having its front end weighted so as to fall by its gravity when released, in combination with the link F having one of its arms connected thereto, substantially as described, whereby the bolt is held suspended until the link is released, as herein set forth.

6. The combination of the weighted swinging bolt B provided with the arm B′, and the slidi yokes D, constructed and arranged to operate substantially as set forth.

J. C. HINTZ, Jr.

Witnesses:
FRANK MILLWARD,
JAMES MOORE.